Figure 1:
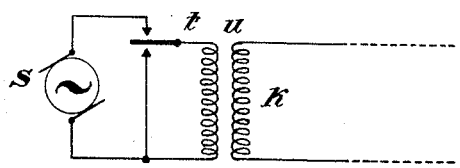

May 8, 1928.

A. CLAUSING 1,669,041

ALTERNATING CURRENT CABLE TRANSMITTER

Filed March 21, 1925

Inventor
Arthur Clausing

Patented May 8, 1928.

1,669,041

UNITED STATES PATENT OFFICE.

ARTHUR CLAUSING, OF BERLIN-CHARLOTTENBURG, GERMANY, ASSIGNOR TO SIEMENS & HALSKE, AKTIENGESELLSCHAFT, OF SIEMENSSTADT, NEAR BERLIN, AND ELSEWHERE, A CORPORATION OF GERMANY.

ALTERNATING-CURRENT CABLE TRANSMITTER.

Application filed March 21, 1925, Serial No. 17,315, and in Germany March 25, 1924.

In the U. S. application for patent, Serial No. 661,174 filed September 6, 1923, to Luschen et al. for alternating current telegraphy, reference is made to the fact that in telegraphy with alternating current over long cables the current flowing thru the cable is composed of a direct current impulse (transient component or equalizing current) on which is superimposed the carrier current. So-called "alternating current" telegraphy is by no means identical with ordinary "cable telegraphy" in which latter the signals consist alternately of positive and negative individual impulses so that for the duration of one signal the character (positive or negative) of the current remains the same. In other words cable telegraphy deals with direct current impulses.

In contradistinction in so-called alternating current telegraphy each signal impulse in itself consists of a sequence of current impulses whose direction continually alternates in accordance with the frequency of the current used.

If now in accordance with the explanation given in the aforesaid application a direct current component is formed upon which the alternating current of the signal is superimposed a receiver connected in the ordinary way to the far end of the cable would not respond to the alternating current component but since the direct current component quite frequently has many times the amplitude of the alternating curent component it would respond to the direct current component. This would mean in other words that the telegraphing speed which is expected to be raised by using alternating current would again be limited to that with so-called direct current cable telegraphing.

In order to prevent this the aforesaid application proposes to insert at the receiving end a transformer between the cable end and the receiving apparatus proper. The impedance of the secondary winding of this transformer is made of the order of the receiver impedance, and the impedance of the primary winding is made of the order of the cable impedance at the frequency of the alternating current used, so that, as is well known, a maximum energy transmission of the alternating current component but a very unfavorable transmission of the energy represented by the transient current component occurs. Thus at the ends of the primary of such a transformer potential differences for the alternating current arise whereas for the direct current component no appreciable potential differences can develop. By means of this existing alternating potential, an alternating current will be produced in the secondary of such a transformer which can be directly used for operating the receiver.

Figure 2:
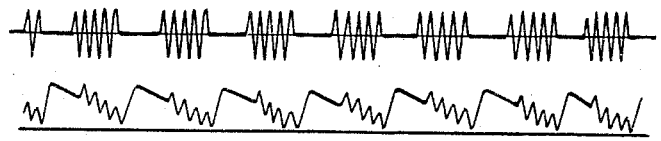
Figure 3:
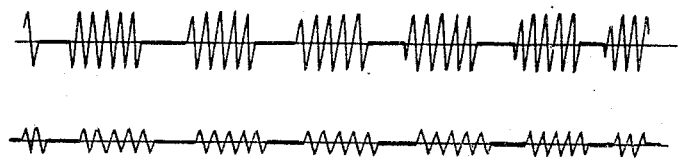

I have found that it is possible to diminish the effect of the equalizing current upon the receiver by inserting a repeater at the beginning of the line behind the transmitter. An example illustrating how this is done is shown in the accompanying drawing in which Fig. 1 represents a transmitter circuit diagram and Figs. 2 and 3 represent oscillograms. The transmitter $a$ may by means of the key $t$ be connected to the primary windings of the repeater (transformer) $u$. The secondary winding of this repeater is connected to the cable $k$, the remote end of which is supposed to be connected to the receiver.

A considerably improved effect is however obtained by employing repeaters (transformers) at the transmitting end as well as at the receiving end of the cable.

In the Figures 2 and 3 two oscillograms are shown as examples. Of these the oscillogram shown in Fig. 2 has been taken when a repeater was arranged behind the sender and the oscillogram of Fig. 3 has been taken when a repeater was arranged at both ends of the telegraph line. The upper curves of each oscillogram show the original signals as delivered by the transmitter, whilst the lower curves show the signals finally observed in the receiver. As will be seen from these figures the transmitting of the signals according to Fig. 3 takes place almost completely regularly, without any effect of the equalizing current being noticeable, whereas in Fig. 2 the effect of the equalizing current is still rather perceptible.

What I claim as my invention and desire to secure by Letters Patent is:—

1. In a coupling arrangement for the transmission of telegraphic signals by means of alternating currents over cables particularly submarine cables, a source of alternating current, a signal transmitter, a cable for conveying the transmitted signals and a repeater connecting the said signal transmitter to the said cable, the primary impedance of said repeater being of the order of the apparent impedance of the source of alternating currents and the secondary impedance of said repeater being of the order of the impedance of the cable with respect to the carrier frequency in order to transmit the maximum amount of carrier frequency energy and to attenuate the transient current impulses which tend to flow through the cable.

2. In a coupling arrangement for the transmission of telegraphic signals by means of alternating current over cables, particularly submarine cables, a source of alternating currents, a signal transmitter, a cable, a receiver, a repeater connecting the said transmitter to said cable, and another repeater connecting the said receiver to the said cable, the primary impedance of the first repeater being substantially of the order of the alternating current source impedance and the secondary impedance of this repeater being substantially of the order of the cable impedance, the primary impedance of the second repeater being substantially of the order of the cable impedance and the secondary impedance of this repeater being similarly matched with the receiver impedance at the carrier frequency employed in order to transmit the maximum amount of the carrier frequency energy and to attenuate the transient current impulses which tend to flow through the cable.

In testimony whereof I affix my signature.

ARTHUR CLAUSING.